United States Patent
Lee

(10) Patent No.: US 11,636,205 B2
(45) Date of Patent: Apr. 25, 2023

(54) METHOD AND SYSTEM FOR DETECTING MALWARE USING MEMORY MAP

(71) Applicant: LINE Corporation, Tokyo (JP)

(72) Inventor: Changseon Lee, Tokyo (JP)

(73) Assignee: LINE CORPORATION, Tokyo (JP)

( * ) Notice: Subject to any disclaimer, the term of this patent is extended or adjusted under 35 U.S.C. 154(b) by 120 days.

(21) Appl. No.: 17/205,230

(22) Filed: Mar. 18, 2021

(65) Prior Publication Data

US 2021/0294895 A1    Sep. 23, 2021

(30) Foreign Application Priority Data

Mar. 20, 2020  (KR) .................. 10-2020-0034208

(51) Int. Cl.
*G06F 21/56*  (2013.01)
*G06F 21/55*  (2013.01)

(52) U.S. Cl.
CPC .......... *G06F 21/566* (2013.01); *G06F 21/554* (2013.01); *G06F 21/564* (2013.01); *G06F 21/568* (2013.01)

(58) Field of Classification Search
CPC .... G06F 21/566; G06F 21/554; G06F 21/564; G06F 21/568; G06F 21/56
See application file for complete search history.

(56) References Cited

U.S. PATENT DOCUMENTS

| | | | |
|---|---|---|---|
| 2013/0019306 A1* | 1/2013 | Lagar-Cavilla | G06F 21/566 726/22 |
| 2016/0328561 A1* | 11/2016 | Tamir | G06F 21/552 |
| 2017/0289109 A1* | 10/2017 | Caragea | H04L 9/3263 |
| 2021/0390182 A1* | 12/2021 | Boutnaru | G06F 8/433 |

FOREIGN PATENT DOCUMENTS

KR    10-2013-0028257 A    3/2013

* cited by examiner

*Primary Examiner* — Nelson S. Giddins
(74) *Attorney, Agent, or Firm* — Harness, Dickey & Pierce, P.L.C.

(57) ABSTRACT

A malware detection method and system using a memory map. A malware detection method may include collecting, by processing circuitry, a plurality of memory maps from a plurality of client devices, a client program being installed in each of the plurality of client devices, analyzing, by the processing circuitry, a plurality of memory addresses of the plurality of memory maps to obtain an analysis result, and determining, by the processing circuitry, whether malware is present in one of the plurality of client devices based on the analysis result.

21 Claims, 7 Drawing Sheets

FIG. 4

| Enter the pid: 14600 | | | |
|---|---|---|---|
| Address | Size<bytes> | Status | |
| 00000000 | 00010000 | MEM_FREE | |
| 00010000 | 00010000 | MEM_COMMIT | MEM_MAPPED |
| 00020000 | 00010000 | MEM_COMMIT | MEM_MAPPED |
| 00030000 | 00001000 | MEM_COMMIT | MEM_PRIVATE |
| 00031000 | 0000f000 | MEM_FREE | |
| 00040000 | 00001000 | MEM_COMMIT | MEM_IMAGE |
| 00041000 | 0000f000 | MEM_FREE | |
| 00050000 | 00004000 | MEM_COMMIT | MEM_MAPPED |
| 00054000 | 0000c000 | MEM_FREE | |
| 00060000 | 00039000 | MEM_RESERVE | MEM_PRIVATE |
| 00099000 | 00004000 | MEM_COMMIT | MEM_PRIVATE |
| 0009C000 | 00004000 | MEM_COMMIT | MEM_PRIVATE |
| 000A0000 | 00001000 | MEM_COMMIT | MEM_MAPPED |
| 000A0000 | 0000f000 | MEM_FREE | |
| 000B0000 | 00001000 | MEM_COMMIT | MEM_PRIVATE |
| 000B1000 | 0000f000 | MEM_FREE | |
| 000C0000 | 00001000 | MEM_COMMIT | MEM_PRIVATE |
| 000C1000 | 0000f000 | MEM_FREE | |
| 000D0000 | 0000c000 | MEM_COMMIT | MEM_PRIVATE |
| 000DC000 | 00004000 | MEM_FREE | |

FIG. 5

| Enter the pid: 14600 | | | |
|---|---|---|---|
| Address | Size<bytes> | Status | |
| 00000000 | 00010000 | MEM_FREE | |
| 00100000 | 00010000 | MEM_COMMIT | PAGE_READWRITE |
| 00200000 | 00010000 | MEM_COMMIT | PAGE_READWRITE |
| 00300000 | 00001000 | MEM_COMMIT | PAGE_READWRITE |
| 00310000 | 0000f000 | MEM_FREE | |
| 00400000 | 00001000 | MEM_COMMIT | |
| 00410000 | 0000f000 | MEM_FREE | |
| 00500000 | 00004000 | MEM_COMMIT | |
| 00540000 | 0000c000 | MEM_FREE | |
| 00600000 | 00001000 | MEM_COMMIT | |
| 00610000 | 0000f000 | MEM_FREE | |
| 00700000 | 00001000 | MEM_COMMIT | PAGE_READWRITE |
| 00710000 | 0000f000 | MEM_FREE | |
| 00800000 | 000fc000 | | |
| 017C0000 | 00001000 | MEM_COMMIT | PAGE_READWRITE |
| 017D0000 | 00003000 | MEM_COMMIT | PAGE_READWRITE |

METHOD AND SYSTEM FOR DETECTING MALWARE USING MEMORY MAP

CROSS-REFERENCE TO RELATED APPLICATION(S)

This U.S. non-provisional application claims the benefit of priority under 35 U.S.C. § 119 to Korean Patent Application No. 10-2020-0034208, filed Mar. 20, 2020, the entire contents of which are incorporated herein by reference in their entirety.

TECHNICAL FIELD

At least one example embodiment of the following description relate to a method and system for detecting malware using a memory map.

BACKGROUND

A malicious program is a collective name of an executable code written for malicious purposes and is also called malware, malicious software, and a malicious code. A malicious program may be classified as a virus, a worm virus, a Trojan horse, and the like, based on a self-replication ability and presence, or absence, of an infected target. As a method of detecting the malicious program, for example, malware, there is a signature-based malware detection method and a heuristic analysis-based malware detection method. The signature-based malware detection method is a method of collecting and diagnosing a sample of a virus. That is, once a new computer virus emerges, anti-virus manufacturers discover a method of collecting a sample of a virus, diagnosing and treating the virus, and adding the discovered method to an anti-virus database. This method is called a reactive method and a trace of the virus is called signature. The heuristic analysis-based malware detection method is a learning-based analysis method that learns a behavior of malware by analyzing the behavior of malware or by analyzing a method thereof.

However, the signature-based malware detection method may not readily detect malware since even a modification of 1 byte of malware's code causes a large number of various variants. Also, the heuristic analysis-based malware detection method has an issue in that a false positive possibility is high. For example, the heuristic analysis-based malware detection method may inspect a behavior of malware, such as using a network and generating a file, and may add a pattern. Therefore, if a general program performs a similar behavior, the general program may be likely to be detected as malware.

SUMMARY

At least one example embodiment provides a malware detection method and system in which a server may collect information about a memory usage area for each of a plurality of client devices each in which a client program is installed, may analyze the collected information, and may determine whether malware is present in a client device.

According to an aspect of at least one example embodiment, there is provided a malware detection method performed by a computer apparatus including processing circuitry, the malware detection method including collecting, by the processing circuitry, a plurality of memory maps from a plurality of client devices, a client program being installed in each of the plurality of client devices, analyzing, by the processing circuitry, a plurality of memory addresses of the plurality of memory maps to obtain an analysis result, and determining, by the processing circuitry, whether malware is present in one of the plurality of client devices based on the analysis result.

The analyzing may include classifying the plurality of memory maps for each of a plurality of client environments, and counting a number of appearances for each of the plurality of memory addresses for each of the plurality of client environments.

The analyzing may include counting a number of appearances for each of the plurality of memory addresses, and verifying one of the plurality of memory maps including a memory address of which the number of appearances is less than or equal to a number of times.

The determining may include determining that the malware is present in the one of the plurality of client devices from which the one of the plurality of memory maps is collected.

The number of times may be set based on a total number of the plurality of client devices and the number of appearances.

The collecting may include collecting the plurality of memory maps in response to the client program being executed in each of the plurality of client devices.

The plurality of memory addresses may at least a portion of memory addresses selected based on at least one of a status or a right of a corresponding memory address from among the plurality of memory addresses.

The malware detection method may further include restricting, by the processing circuitry, the one of the plurality of client devices in response to determining the malware is present in the one of the plurality of client devices.

The restricting may include causing the one of the plurality of client devices to reinstall the client program.

According to an aspect of at least one example embodiment, there is provided a malware detection method performed by a computer apparatus including processing circuitry, the malware detection method including acquiring, by the processing circuitry, a memory map of the computer apparatus under control of a client program executed on the computer apparatus, and transmitting, by the processing circuitry, the memory map to a server that provides a service to the computer apparatus through the client program.

The malware detection method may further include transmitting, by the processing circuitry, information to the server, the information indicating a client environment in which the client program operates.

The server may be configured to determine whether malware is present in one of a plurality of client devices based on a result of analyzing a plurality of memory addresses of a plurality of memory maps collected from the plurality of client devices.

The malware detection method may further include restricting, by the processing circuitry, an operation of the client program in response to receiving a signal from the server. The restricting may include reinstalling the client program.

According to an aspect of at least one example embodiment, there is provided a non-transitory computer-readable record medium storing instructions that, when executed by at least one processor, cause the at least one processor to perform the malware detection method of claim 1.

According to an aspect of at least one example embodiment, there is provided a computer apparatus including processing circuitry configured to cause the computer apparatus to collect a plurality of memory maps from a plurality of client devices, a client program being installed in each of the plurality of client devices, analyze a plurality of memory addresses of the plurality of memory maps to obtain an analysis result, and determine whether malware is present in one of the plurality of client devices based on the analysis result.

According to an aspect of at least one example embodiment, there is provided a computer apparatus including processing circuitry. The processing circuitry is configured to acquire a memory map of the computer apparatus under control of a client program executed on the computer apparatus; and to transmit the memory map acquired to a server that provides a service to the computer apparatus through the client program.

According to at least one example embodiment, a server may collect information about a memory usage area for each of a plurality of client devices each in which a client program is installed, may analyze the collected information, and may determine whether malware is present in a client device.

Further areas of applicability will become apparent from the description provided herein. The description and specific examples in this summary are intended for purposes of illustration only and are not intended to limit the scope of the present disclosure.

BRIEF DESCRIPTION OF DRAWINGS

FIG. 4 illustrates an example of a status for each memory address in an actual process according to at least one example embodiment;

FIG. 5 illustrates an example of a result of monitoring a memory map according to at least one example embodiment;

DETAILED DESCRIPTION

Figure 1:
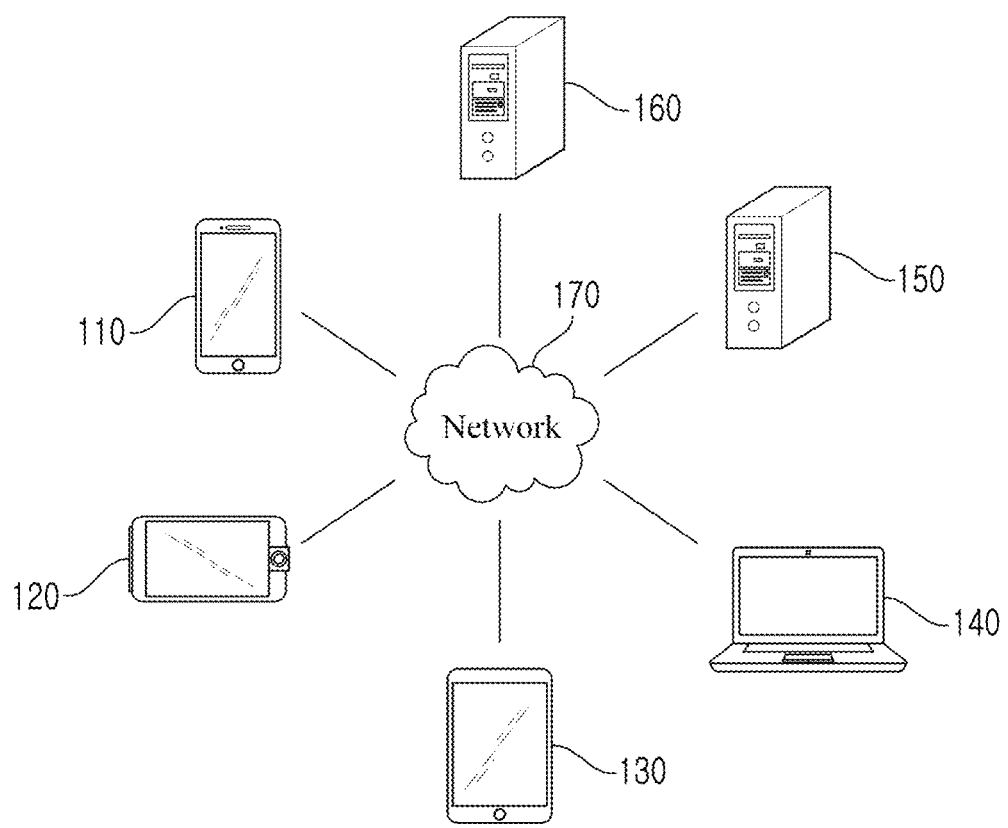
FIG. 1 is a diagram illustrating an example of a network environment according to at least one example embodiment.

At least one example embodiment will be described in detail with reference to the accompanying drawings. At least one example embodiment, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to at least one example embodiment. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which at least one example embodiment belongs. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned herein. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, at least one example embodiment may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of at least one example embodiment may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, at least one example embodiment will be described with reference to the accompanying drawings.

A malware detection system according to at least one example embodiment may include a computer apparatus that implements at least one client and a computer apparatus that implements at least one server. A malware detection method according to at least one example embodiment may be implemented by at least one computer apparatus included in the malware detection system. Here, a computer program according to at least one example embodiment may be installed and executed on the computer apparatus and the computer apparatus may perform the malware detection method under control of the executed computer program. The aforementioned computer program may be stored in a non-transitory computer-readable record medium to computer-implement the malware detection method in conjunction with the computer apparatus.

FIG. 1 illustrates an example of a network environment according to at least one example embodiment. Referring to FIG. 1, the network environment may include a plurality of electronic devices 110, 120, 130, and/or 140, a plurality of servers 150 and/or 160, and/or a network 170. FIG. 1 is provided as an example only. A number of electronic devices or a number of servers is not limited thereto. Also, the network environment of FIG. 1 is provided as an example of environments applicable to at least one example embodiment and the environment applicable to at least one example embodiment is not limited to the network environment of FIG. 1.

Each of the plurality of electronic devices 110, 120, 130, and/or 140 may be a fixed terminal or a mobile terminal that is configured as a computer apparatus. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet personal computer (PC), and/or the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and/or the Internet. Also, the network 170 may include at least one of network topologies that include a bus network, a star network, a ring network, a mesh network, a star-bus network, a tree or hierarchical network, and/or the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and/or 140 over the network 170. For example, the server 150 may be a system that provides a service to the plurality of electronic devices 110, 120, 130, and/or 140 connected over the network 170. For example, the service may include an instant messaging service, a game service, a group call service or a voice conference service, a messaging service, a mail service, a social network service, a map service, a translation service, a financial service, a payment service, a search service, a content providing service and/or a contentment providing service.

Figure 2:
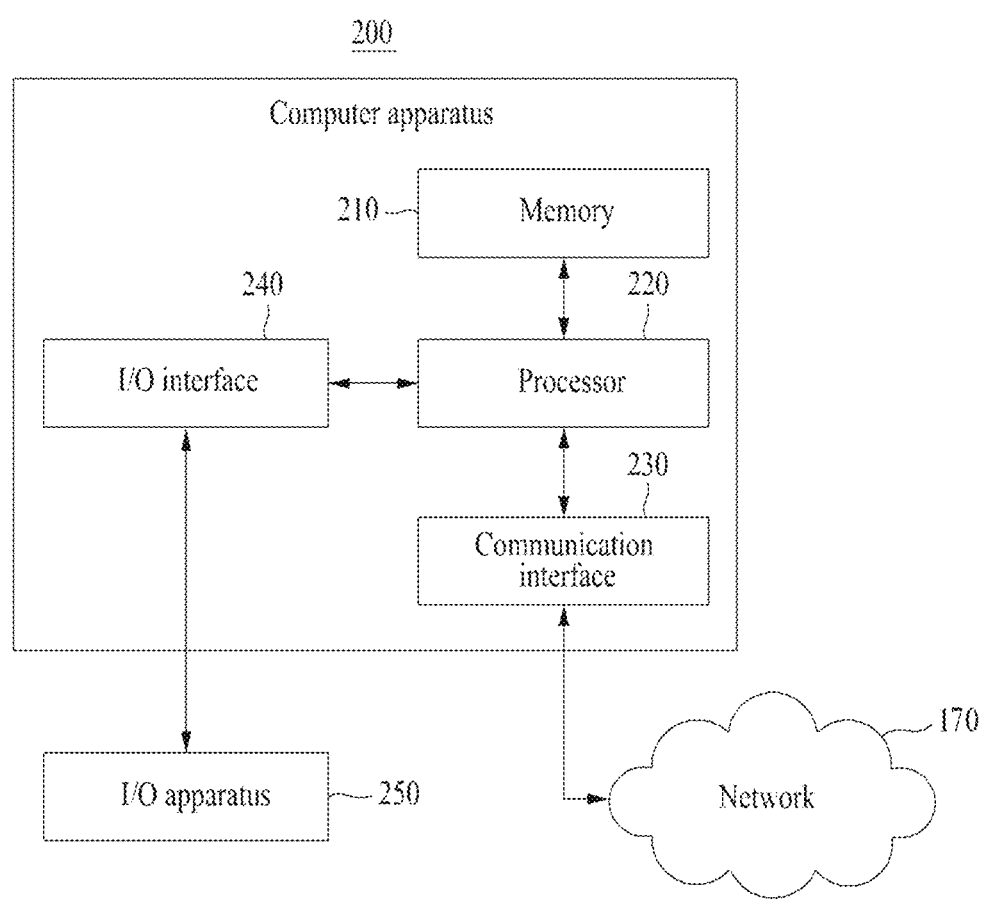
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and/or 140, and/or the servers 150 and/or 160 may be implemented in, or by, a computer apparatus 200 of FIG. 2.

Referring to FIG. 2, the computer apparatus 200 may include a memory 210, a processor 220, a communication interface 230, and/or an input/output (I/O) interface 240. The memory 210 may include a permanent mass storage device, such as a random access memory (RAM), a read only memory (ROM), and/or a disk drive, as a non-transitory computer-readable record medium. The permanent mass storage device, such as a ROM and/or a disk drive, may be included in the computer apparatus 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to at least one example embodiment, software components may be loaded to the memory 210 through the communication interface 230 instead of, or in addition to, the non-transitory computer-readable record medium. For example, the software components may be loaded to the memory 210 based on a computer program installed by files provided over the network 170.

The processor 220 may be configured to process instructions of a computer program by performing basic arithmetic operations, logic operations, and/or I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and other apparatuses, for example, the aforementioned storage devices, over the network 170. For example, the processor 220 of the computer apparatus 200 may transfer a request or an instruction created based on a program code stored in the storage device such as the memory 210, data, a file, etc., to the other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, data, etc., received through the communication interface 230 may be transferred to the processor 220 or the memory 210, and a file, etc., may be stored in a storage medium, for example, the permanent storage device, further includable in the computer apparatus 200.

The I/O interface 240 may be a device used for interfacing with an I/O apparatus 250 (e.g., an input device and/or an output device). For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O apparatus 250 may be at least one input device and/or output device configured as (e.g., incorporated in) a single device with the computer apparatus 200. For example, a touchscreen, a microphone, a speaker, etc., may be included in the computer apparatus 200, such as a smartphone.

According to at least one example embodiment, the computer apparatus 200 may include a number of components greater than or less than a number of components shown in FIG. 2. However, some components according to the related art are not illustrated in detail. For example, the computer apparatus 200 may include at least a portion of the I/O apparatus 250, or may further include other components, for example, a transceiver, a database (DB), and/or the like.

Figure 3:
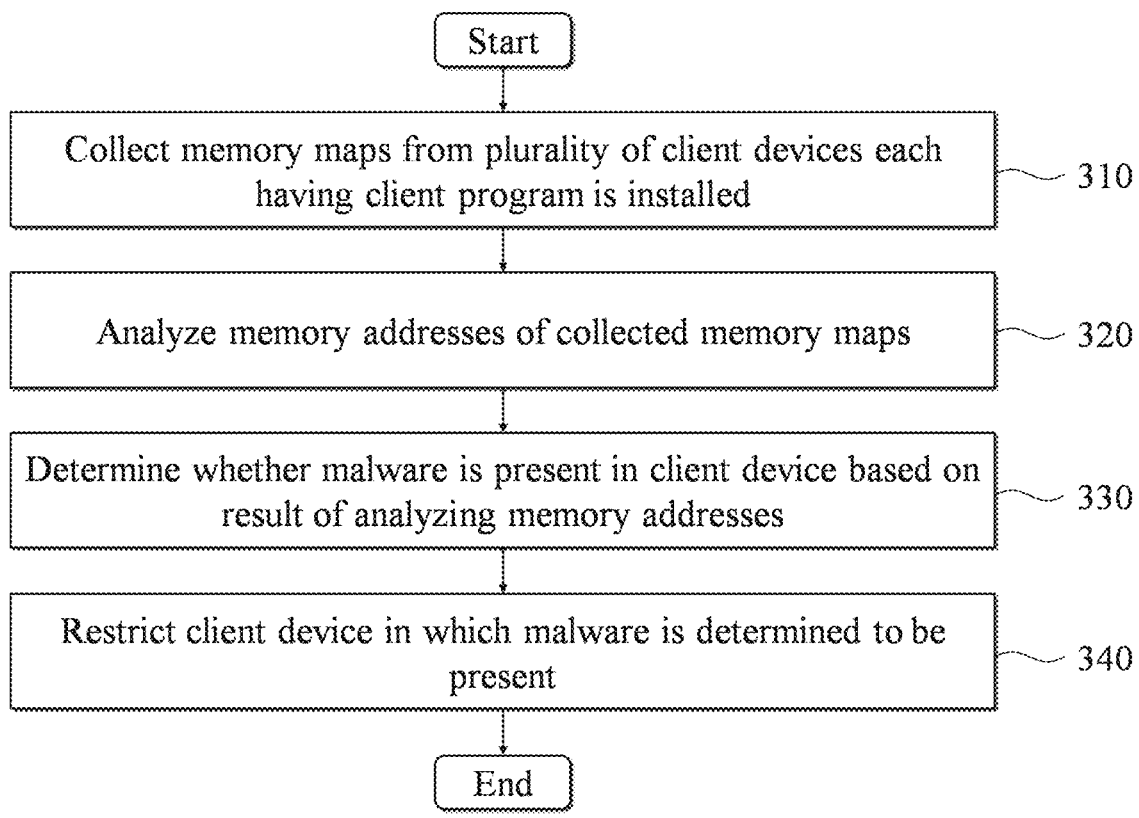
FIG. 3 is a flowchart illustrating an example of a malware detection method of a server according to at least one example embodiment.

FIG. 3 is a flowchart illustrating an example of a malware detection method of a server according to at least one example embodiment. The malware detection method of FIG. 3 may be performed by the computer apparatus 200 that implements the server (e.g., the server 150). Here, the server may be an entity that provides a service to a plurality of client devices in each of which a client program is installed. Here, the processor 220 of the computer apparatus 200 may be configured to execute a control instruction according to a code of at least one computer program, and/or a code of an OS, included in the memory 210. Here, the processor 220 may control the computer apparatus 200 to perform operations 310 to 330 included in the method of FIG. 3 in response to the control instruction provided from a code stored in the computer apparatus 200.

Referring to FIG. 3, in operation 310, the computer apparatus 200 may collect memory maps from a plurality of client devices in each of which a client program is installed. Here, the computer apparatus 200 may collect a memory map when a corresponding client program is executed on each client device. For example, the client program executed on a client device may collect a memory map of the client device and may transmit the collected memory map to the server in an environment in which the client device receives a service provided from the server. Here, information about a memory (e.g., the memory of the client device) may include information about a memory usage area. According to at least one example embodiment, the same client program, or similar client programs, to which the memory map corresponds may be installed on each of the plurality of client devices. According to at least one example embodiment, the client program may be used by each of the plurality of client devices for receiving the service from the server. According to at least one example embodiment, the memory map of the client device may include, or may be transmitted to the server along with, the information about the memory of the client device (e.g., information about a memory usage area). According to at least one example embodiment, the memory map, and/or information about the memory, may correspond to only the memory addresses into which the client program is installed and/or the memory addresses used during execution of the client program. According to at least one example embodiment, the computer apparatus 200 may collect a plurality of sets of memory maps corresponding to different client programs installed on the plurality of client devices in common.

In operation 320, the computer apparatus 200 may analyze memory addresses of the collected memory maps. For example, the computer apparatus 200 may classify the collected memory maps for each client environment. For example, the client environment may be classified based on at least one of an operating system (OS) (e.g., an OS type) and/or a version of the OS (e.g., an OS version). To this end, a client device may further transmit information about a client environment (OS and/or a version of the OS) of the client device to the server. In operation 310, the computer apparatus 200 may further collect information about the OS and/or the version of the OS from the client device. According to at least one example embodiment, each respective client device among the plurality of client devices may transmit an indication of the OS and/or the version of the OS of (e.g., executing on) the respective client device to the computer apparatus 200. In this case, the computer apparatus 200 may classify a memory map collected from a specific client device into an OS and/or a version of the OS of the specific client device. According to at least one example embodiment, the computer apparatus 200 may classify the memory maps received from the plurality of client devices to obtain one or more sets of memory maps, each set of memory maps corresponding to a set of clients having the same OS and/or version of the OS, or similar client OS's and/or versions of the OS. In this classification, it is assumed that, in the case of installing and executing the same client program, or similar client programs, in client devices having the same OS and/or version of the OS, or similar client OS's and/or versions of the OS, memory addresses of memory maps allocated for the corresponding client program are mostly the same or similar. Here, the computer apparatus 200 may count a number of appearances (a number of times a corresponding memory address is detected to be used from the collected memory maps) for each memory address from the classified memory maps for each client environment. According to at least one example embodiment, the computer apparatus 200 may count a number of appearances for each memory address in each memory map in a set of memory maps. According to at least one example embodiment, the computer apparatus 200 may count the number of appearances for only the memory addresses into which the client program is installed and/or the memory addresses used during execution of the client program. Also, the computer apparatus 200 may verify a memory map including a memory address of which the counted number of appearances is less than or equal to a preset or alternatively, given number of times. For example, referring to Table 1, if the preset or alternatively, given number of times is 3, the computer apparatus 200 may verify a memory map that includes a memory address "777D0000-777D1000" of which a value of "Count" is 1. Here, that the value of "Count" is 1 may represent that a single memory map includes the memory address "777D0000-777D1000."

TABLE 1

| Address | Status | Constant | Count |
|---|---|---|---|
| 00000000-00010000 | MEM_FREE | — | 10 |
| 00001000-00020000 | MEM_COMMIT | PAGE_READWRITE | 10 |
| . . . | . . . | . . . | . . . |
| 00121000-00130000 | MEM_FREE | PAGE_READWRITE | 9 |
| 777D0000-777D1000 | MEM_COMMIT | PAGE_EXECUTEREAD | 1 |
| 7EFD8000-7EFDB000 | MEM_COMMIT | PAGE_READWRITE | 10 |

In detail, for example, it is assumed that each of ten users uses a service through a client device of a corresponding user in the same client environment, or similar client environments, for example, the same OS and/or version of the OS, or similar OS's and/or similar versions of the OS. Here, with the assumption that a client device of one of the ten users additionally uses a new memory area unused in client devices of the other users, there is a high probability that malware has penetrated the client device of the single user.

As described above, the preset or alternatively, given number of times used to determine presence or absence of malware may be statically, or dynamically, set based on a total number of clients and/or a value of "Count" for each memory address. For example, in a service used by 1 million users, most memory addresses have a value of "Count" greater than or equal to 900,000, whereas a portion of the memory addresses have a value of "Count" less than or equal 1,000. In this situation, the computer apparatus 200 may set a value that is sufficiently less than 1 million corresponding to the total number of clients, and greater than 1,000 as the preset or alternatively, given number of times, to determine the presence or the absence of malware. According to at least one example embodiment, the total number of clients and/or the value of "Count" may be design parameters determined through empirical study.

In operation 330, the computer apparatus 200 may determine whether malware is present in a client device based on a result of analyzing the memory addresses. For example, the computer apparatus 200 may determine that malware is present in a client device transmitting the memory map verified in operation 320. In detail, for example, referring to Table 1, the computer apparatus 200 may determine that malware is present in a client device transmitting the memory map including the memory address "777D0000-777D1000" with a value of "Count" of 1, that is, a client device that additionally uses the memory address "777D0000-777D1000" not used in other client devices.

Also, when determining whether a memory area, for example, a memory address, not previously used is present in a memory map received from a client device, the definition for a memory usage provided from an OS may be used. That is, the computer apparatus 200 may monitor the memory map based on the definition about the memory usage. For example, Microsoft, that provides the Windows Operating System, provides detailed instructions about memory access and usage in a Microsoft Developer Network (MSDN). Based on memory protection constants of Table 2, various rights may be granted, such as, for example, an accessible memory address, an inaccessible address, an accessible but readable address, and/or a readable but non-writable address.

TABLE 2

| Constant | Value | Monitoring |
|---|---|---|
| PAGE_EXECUTE | 0 × 10 | X |
| PAGE_EXECUTE_READ | 0 × 20 | X |
| PAGE_EXECUTE_READWRITE | 0 × 40 | O |
| PAGE_EXECUTE_WRITECOPY | 0 × 80 | O |
| PAGE_NOACCESS | 0 × 01 | X |
| PAGE_READONLY | 0 × 02 | X |
| PAGE_READWRITE | 0 × 04 | O |
| PAGE_WRITECOPY | 0 × 08 | O |

Malware such as a hacking tool or a hacking module may operate to initially verify a memory address having a right, such as "PAGE_READWRITE", "PAGE_WRITECOPY", "PAGE_EXECUTE_READWRITE", and/or "PAGE_EXECUTE_WRTIECOPY" in Table 2. Therefore, the computer apparatus 200 may initially monitor a constant used in malware to verify whether malware is present.

FIG. 4 illustrates an example of a status for each memory address in an actual process according to at least one example embodiment.

Whether a memory is available in a memory protection constant may be defined as Table 3.

TABLE 3

| Constant | Value | Monitoring |
|---|---|---|
| MEM_COMMIT | 0 × 1000 | O |
| MEM_FREE | 0 × 10000 | O |
| MEM_RESERVE | 0 × 40 | O |
| MEM_IMAGE | 0 × 80 | X |
| MEM_MAPPED | 0 × 01 | X |
| MEM_PRIVATE | 0 × 02 | X |

Referring to Table 3, "FREE" (a memory status according thereto may be represented as "MEM_FREE") refers to an unused free memory area, "RESERVE" (a memory status according thereto may be represented as "MEM_RESERVE") refers to an area in which only an address is allocated, and "COMMIT" (a memory status according thereto may be represented as "MEM_COMMIT") refers to an area in which a virtual memory and a physical memory are used. Since malware may inject a code in "FREE" and "COMMIT" memory areas, monitoring may be generally performed for memory areas of "FREE" and "COMMIT". Referring to FIG. 4, there is a memory area set to "PRIVATE" (a memory status according thereto may be represented as "MEM_PRIVATE") regardless of "COMMIT". A "PRIVATE" area is prevented from access of, or reduced access provided with regards to, another process and thus, may be excluded from monitoring and/or monitoring thereof may be reduced. FIG. 5 illustrates an example of a result of monitoring a memory map based on a malware detection method according to at least one example embodiment. That is, the computer apparatus 200 may select (e.g., detect, determine, etc.) a client device in which malware is installed by analyzing at least a portion of memory addresses selected based on at least one of a status and/or a right of a memory address (e.g., "FREE," "RESERVE," "COMMIT" and/or "PRIVATE") among the entire memory addresses included in the memory maps. According to at least one example embodiment, the analyzing of the memory addresses in operation 330 may be performed only with regards to "FREE" and/or "COMMIT" memory areas, and/or may not be performed in "RESERVE" and/or "PRIVATE" memory areas. According to at least one example embodiment, the definition for the memory usage provided from the OS of a client may be used to determine the memory areas of the memory map.

In operation 340, the computer apparatus 200 may restrict a client device in which the malware is determined to be present. For example, the computer apparatus 200 may suspend providing of a service to the corresponding client device or may request the corresponding client device to reinstall the client program. The computer apparatus 200 may restrict the client device that is determined to have malware installed, such that the corresponding client device may not use a service provided from the computer apparatus 200. According to at least one example embodiment, the computer apparatus may cause the client device determined to have malware installed to reinstall the client program by sending a signal to the client device. The signal may include a command and/or data used for performing the reinstallation.

Figure 6:
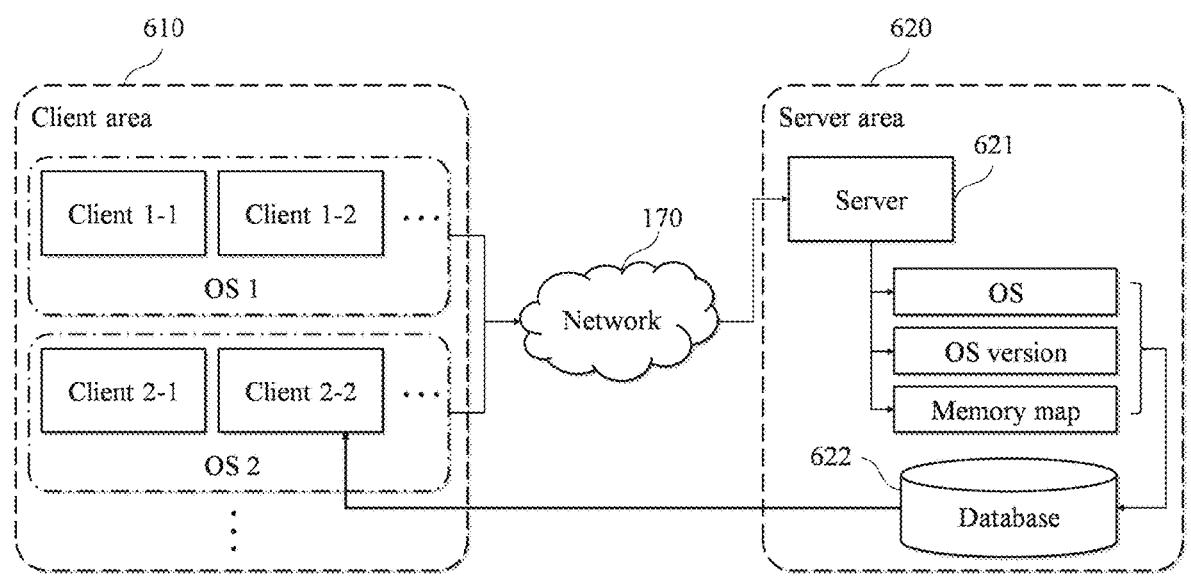
FIG. 6 illustrates an example of a monitoring structure according to at least one example embodiment.

FIG. 6 illustrates an example of a monitoring structure according to at least one example embodiment. Referring to FIG. 6, clients of a client area 610 may communicate with a server 621 of a server area 620 over the network 170. Here, each of the clients (e.g., Client 1-1, Client 1-2, . . . , Client 2-1, Client 2-2, . . . , etc.) may collect information about an OS of a corresponding client, a version of the OS, and/or a memory map, and may transfer the collected information to the server 621 over the network 170. The server 621 may classify the collected memory maps for each OS and/or version of the OS, and may select, from among the classified memory maps, a memory map that includes a memory address used at a relatively low frequency, for example, a preset or alternatively, given number of times or less, for each OS and/or version of the OS, and may store information about a client associated with the selected memory map in a database 622. As described above, in the case of using the same client program, or similar client programs, in the same OS and/or OS version, or similar OS and/or OS versions, that a specific client uses a memory address not used by other clients may represent that malware is likely to be present in the specific client. Therefore, the server 621 may restrict the corresponding specific client based on information about the client stored in the database 622. For example, the server 621 may restrict a client device in which malware is installed to not use a service, by prohibiting a corresponding client from using or reducing the client's access to the service, and/or by requesting or causing the client to reinstall a client program.

Figure 7:
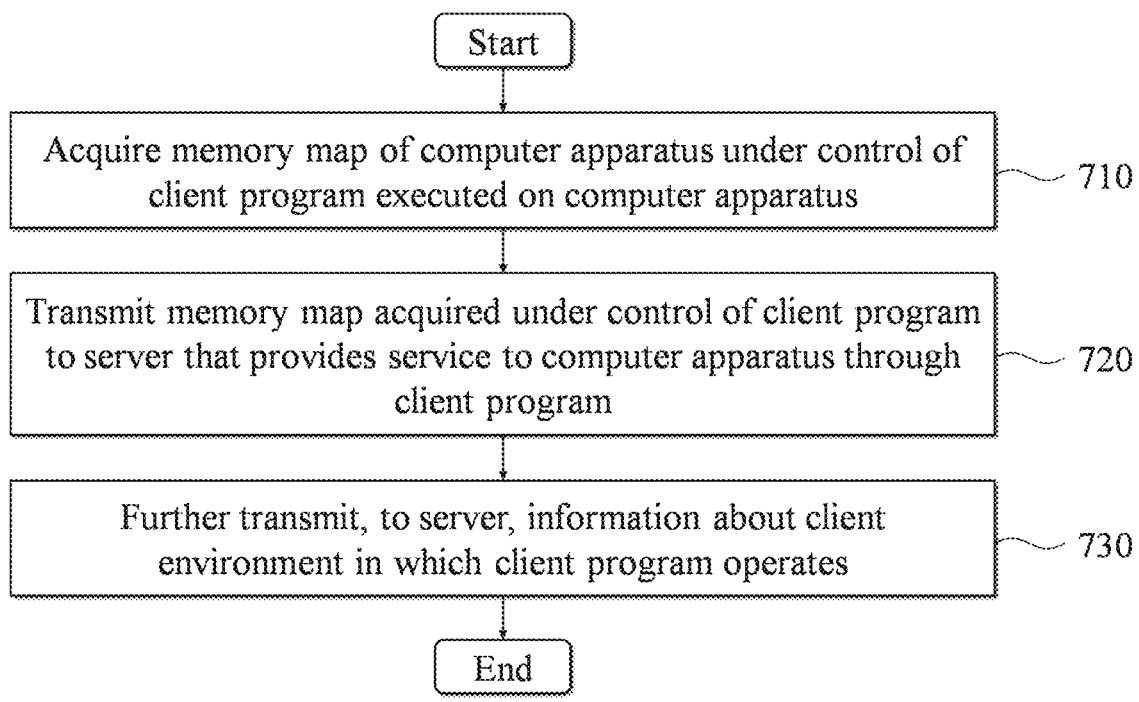
FIG. 7 is a flowchart illustrating an example of a malware detection method of a client according to at least one example embodiment.

FIG. 7 is a flowchart illustrating an example of a malware detection method of a client according to at least one example embodiment. The malware detection method may be performed by the computer apparatus 200 that implements a client device. Here, the client device may refer to an entity that receives a service from a server under control of a client program installed in the client device. The processor 220 of the computer apparatus 200 may be configured to execute a control instruction according to a code of at least one computer program and/or a code of an OS included in the memory 210. Here, the processor 220 may control the computer apparatus 200 to perform operations 710 to 730 included in the method of FIG. 7 in response to a control instruction provided from a code stored in the computer apparatus 200.

Referring to FIG. 7, in operation 710, the computer apparatus 200 may acquire a memory map of the computer apparatus 200 under control of a client program executed on the computer apparatus 200. Here, the memory map may include information about a memory usage area allocated to execute the client program in the computer apparatus 200.

In operation 720, the computer apparatus 200 may transmit the memory map acquired under control of the client program to a server that provides a service to the computer apparatus 200 through the client program.

In operation 730, the computer apparatus 200 may further transmit, to the server, information about a client environment (e.g., an OS and/or a version of the OS) in which the client program operates.

Each of a plurality of client devices that receives the service from the server may transfer information about a corresponding client environment and/or a memory map to the server. In this case, the server may determine whether malware is present in each client device based on a result of analyzing memory addresses of memory maps collected from the plurality of client devices.

As described above, according to at least one example embodiment, a server may collect information about a memory usage area for each of a plurality of client devices in each of which a client program is installed, may analyze the collected information, and may determine whether malware is present in a client device. Also, a restriction related to a use of a service may be applied to a client in which malware is installed.

Conventional systems, devices and methods for detecting malware include signature-based methods and heuristic analysis-based methods. The signature-based methods involve maintaining an anti-virus database including samples of different viruses. However, the signature-based methods are insufficiently effective because slight modification of malware code results in a large number of variants of the malware. The heuristic analysis-based methods involve learning patterns in malware behavior. However, the heuristic analysis-based methods are insufficiently accurate because behaviors of malware are similar to behaviors of benign programs, resulting in a large number of false positive malware detection results.

However, according to at least one example embodiment, improved systems, devices and methods are provided for detecting malware. For example, memory maps collected from client devices are analyzed to detect unusual memory address usage indicative of the presence of malware. Accordingly, the improved systems, devices and methods do not rely on an anti-virus database or a pattern of malware behavior, and thus, overcome the deficiencies of the conventional systems, devices and methods to improve the effectiveness and/or accuracy of malware detection.

According to at least one example embodiment, operations described herein as being performed by the computer apparatus 200, the processor 220, the server and/or the client device(s) may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The systems and/or the apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The above-described methods according to at least one example embodiment may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by app store that distributes applications or a site, a server, and the like that supplies and distributes other various types of software. Examples of a program instruction may include a machine language code produced by a compiler and a high-language code executable by a computer using an interpreter.

While this disclosure includes at least one example embodiment, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A malware detection method performed by a computer apparatus including processing circuitry, the malware detection method comprising:
   collecting, by the processing circuitry, a plurality of memory maps from a plurality of client devices, a client program being installed in each of the plurality of client devices;
   counting, by the processing circuitry, a number of times each respective memory address among a plurality of memory addresses is in use in each of the plurality of memory maps, the plurality of memory addresses being included in each of the plurality of memory maps; and
   determining, by the processing circuitry, whether malware is present in a first client device among the plurality of client devices based on a first number of times a first memory address among the plurality of memory addresses is in use among the plurality of memory maps.

2. The malware detection method of claim 1, further comprising:
   classifying the plurality of memory maps into one or more sets of memory maps for each of a plurality of client environments,
   wherein the counting counts the number of times each respective memory address among the plurality of memory addresses is in use in each memory map among a first set of memory maps, the first set of memory maps being among the one or more sets of memory maps.

3. The malware detection method of claim 1, wherein the determining comprises determining whether the first number of times is less than or equal to a second number of times.

4. The malware detection method of claim 3, wherein the determining comprises determining that the malware is present in the first client device.

5. The malware detection method of claim 3, wherein the second number of times is set based on a total number of the plurality of client devices and the number of times each respective memory address is in use in each of the plurality of memory maps.

6. The malware detection method of claim 1, wherein the collecting comprises collecting the plurality of memory maps in response to the client program being executed in each of the plurality of client devices.

7. The malware detection method of claim 1, wherein the plurality of memory addresses comprise at least a portion of memory addresses selected based on at least one of a status or a right of a corresponding memory address from among the plurality of memory addresses.

8. The malware detection method of claim 1, further comprising:
   restricting, by the processing circuitry, the first client device in response to determining the malware is present in the first client device.

9. A malware detection method performed by a computer apparatus comprising processing circuitry, the malware detection method comprising:
   acquiring, by the processing circuitry, a memory map of the computer apparatus under control of a client program executed on the computer apparatus;
   transmitting, by the processing circuitry, the memory map to a server that provides a service to the computer apparatus through the client program; and
   receiving, by the processing circuitry, a signal from the server based on a first number of times a first memory address among a plurality of memory addresses is in use among a plurality of memory maps, the plurality of memory maps including the memory map and at least one other memory map of at least one other computer apparatus.

10. The malware detection method of claim 9, further comprising:
    transmitting, by the processing circuitry, information to the server, the information indicating a client environment in which the client program operates.

11. The malware detection method of claim 9, wherein the server is configured to determine whether malware is present in one of a plurality of client devices based on a result of analyzing the plurality of memory addresses of the plurality of memory maps collected from the plurality of client devices, the plurality of client devices including the computer apparatus and the at least one other computer apparatus.

12. A non-transitory computer-readable record medium storing instructions that, when executed by at least one processor, cause the at least one processor to perform the malware detection method of claim 1.

13. A computer apparatus comprising:
    processing circuitry configured to cause the computer apparatus to, collect a plurality of memory maps from a plurality of client devices, a client program being installed in each of the plurality of client devices, count a number of times each respective memory address among a plurality of memory addresses is in use in each of the plurality of memory maps, the plurality of memory addresses being included in each of the plurality of memory maps, and determine whether malware is present in a first client device among the plurality of client devices based on a first number of times a first memory address among the plurality of memory addresses is in use among the plurality of memory maps.

14. The computer apparatus of claim 13, wherein the processing circuitry is configured to cause the computer apparatus to:

classify the plurality of memory maps into one or more sets of memory maps for each of a plurality of client environments;

count the number of times each respective memory address among the plurality of memory addresses is in use in each memory map among a first set of memory maps, the first set of memory maps being among the one or more sets of memory maps; and determine whether malware is present in the first client device including determining whether the first number of times is less than or equal to a second number of times.

15. The computer apparatus of claim 14, wherein the processing circuitry is configured to cause the computer apparatus to determine that the malware is present in the first client device.

16. The computer apparatus of claim 13, wherein the processing circuitry is configured to cause the computer apparatus to restrict the first client device in response to determining the malware is present in the first client device.

17. The malware detection method of claim 8, wherein the restricting comprises causing the first client device to reinstall the client program.

18. The malware detection method of claim 9, further comprising:

restricting, by the processing circuitry, an operation of the client program in response to receiving the signal from the server.

19. The malware detection method of claim 18, wherein the restricting comprises reinstalling the client program.

20. The computer apparatus of claim 16, wherein the processing circuitry is configured to cause the computer apparatus to restrict the first client device by causing the first client device to reinstall the client program.

21. The malware detection method of claim 1, wherein the determining comprises:

determining whether the first number of times is less than or equal to a second number of times, the second number of times being based on a total number of the plurality of client devices.

* * * * *